United States Patent
Iies et al.

(10) Patent No.: US 7,179,320 B2
(45) Date of Patent: Feb. 20, 2007

(54) AIR RECHARGE SYSTEM DRYER AND METHODS THEREFOR

(75) Inventors: Tom Iies, Rancho Palos Verde, CA (US); Mike S. Koerner, Rancho Palos Verde, CA (US)

(73) Assignee: Honeywell International, Inc., Morristown, NJ (US)

( * ) Notice: Subject to any disclaimer, the term of this patent is extended or adjusted under 35 U.S.C. 154(b) by 307 days.

(21) Appl. No.: 10/845,451

(22) Filed: May 12, 2004

(65) Prior Publication Data

US 2005/0252375 A1 Nov. 17, 2005

(51) Int. Cl.
*B01D 52/02* (2006.01)

(52) U.S. Cl. .................. 95/19; 95/21; 95/122; 95/148; 96/113; 96/114; 96/144

(58) Field of Classification Search ............... 95/19, 95/21, 117, 121, 122, 148; 96/112, 113, 96/114, 143, 144
See application file for complete search history.

(56) References Cited

U.S. PATENT DOCUMENTS

| | | | |
|---|---|---|---|
| 3,923,479 A * | 12/1975 | Glass et al. ............... | 96/114 |
| 4,549,888 A * | 10/1985 | Fannin ........................ | 96/113 |
| 5,097,659 A | 3/1992 | Lampe et al. | |
| 5,123,277 A * | 6/1992 | Gray et al. ................. | 73/29.01 |
| 5,458,677 A * | 10/1995 | VanderMolen ............... | 96/113 |
| 2003/0140635 A1 | 7/2003 | Benham, Jr. et al. | |

FOREIGN PATENT DOCUMENTS

JP 02048016 A * 2/1990 ............. 96/113

* cited by examiner

*Primary Examiner*—Robert A. Hopkins
(74) *Attorney, Agent, or Firm*—Oral Caglar, Esq.

(57) ABSTRACT

A method to desorb water from a desiccant of an air recharge system comprises the steps of a) filling a purge reservoir using an air compressor and a desiccant dryer to produce discharge air, b) stopping the air compressor; c) back purging the desiccant, and d) vent resetting the system, wherein the filling a purge reservoir step does not result in an addition of discharge air to an air storage tank in fluid communication with the purge reservoir and wherein the air storage tank is filled with an amount of the discharge air such that the air storage tank is at a full storage tank pressure prior to filling the purge reservoir. A method of filling an air storage tank of an air recharge system is also disclosed.

36 Claims, 5 Drawing Sheets

AIR RECHARGE SYSTEM DRYER AND METHODS THEREFOR

BACKGROUND OF THE INVENTION

The present invention generally relates to apparatus and methods for operation of an air recharge system. More specifically, the present invention relates to apparatus and methods relating to desorbing water from a desiccant dryer and to filling an air storage tank of an air recharge system.

In various aircraft, a stored energy system may include a combustor to combust jet fuel using compressed air, as an energy source to drive a turbine that may be used to start an auxiliary power unit (APU), or to generate electrical and hydraulic power during in-flight emergencies. In addition, the APU may be used to start a main engine of the aircraft, and thus may be used on every flight, and in maintenance actions that require power.

Examples of systems used to start an APU include U.S. Patent Application Publication No. US2003/0140635 A1 to Benham, Jr. et al., (Benham) directed to a jet fuel and air system for starting an APU, which includes a source of pressurized air from at least one storage vessel joined with a fuel source to a turbine power module through a combustor. In Benham, the APU is started by energizing control valves within the system to allow the flow of the compressed air and the fuel into the combustor, wherein the mixture is ignited and the gas generated therefrom is used to turn the turbine of the turbine power module.

Another example of a system for starting an APU is shown in U.S. Pat. No. 5,097,659 to Lempe et al., (Lempe) which is directed to a system similar to that disclosed by Benham. Lempe also discloses the use of pressurized air from a storage vessel in operation of the system disclosed therein.

Accordingly, energy may be stored in such systems in the form of compressed air located in an air storage tank or tanks (e.g., one or more air cylinders or bottles). Depletion of the stored air, in whole or in part, thus may require the air storage tank to be recharged. In order to minimize ground support equipment and to limit the size of the air storage tank(s), an on-board air recharge system may be added to the aircraft to refill/replace the compressed air in the air storage tank as it is utilized for various functions.

In general, an air recharge system (ARS) designed for use in aircraft applications may be used in flight or on the ground to recharge an air storage tank of a stored energy system. The ARS may include a compressor which delivers compressed air from a conditioned air source for storage in an air storage tank. However, ambient air may contain a humidity level of up to about 160 grains of water per pound, and the conditioned air used in one particular application contains about 26 grains of water per pound of air (gr-$H_2O$/lb-air), to about 38 gr-$H_2O$/lb-air. As ambient air may be compressed, the partial pressure of water in the compressed air, and therefore the saturation temperature of the compressed air, may be greatly increased. This may cause water to condense as the pressure of the compressed air is increased. This condensed water may thus be present within the air storage tank. Water contained within an air storage tank may then be allowed to flow into various aircraft systems, wherein water may cause excessive wear and corrosion of the various parts of the aircraft. Water vapor in the compressed air may also lead to ice forming within various aircraft systems, which may result in a system malfunction. Accordingly, it may be necessary to remove moisture from the compressed air of a stored energy system prior to the compressed air being stored in an air storage tank, to prevent a possible system failure, which may result in a loss of the emergency power function or APU starting capability.

Figure 1:
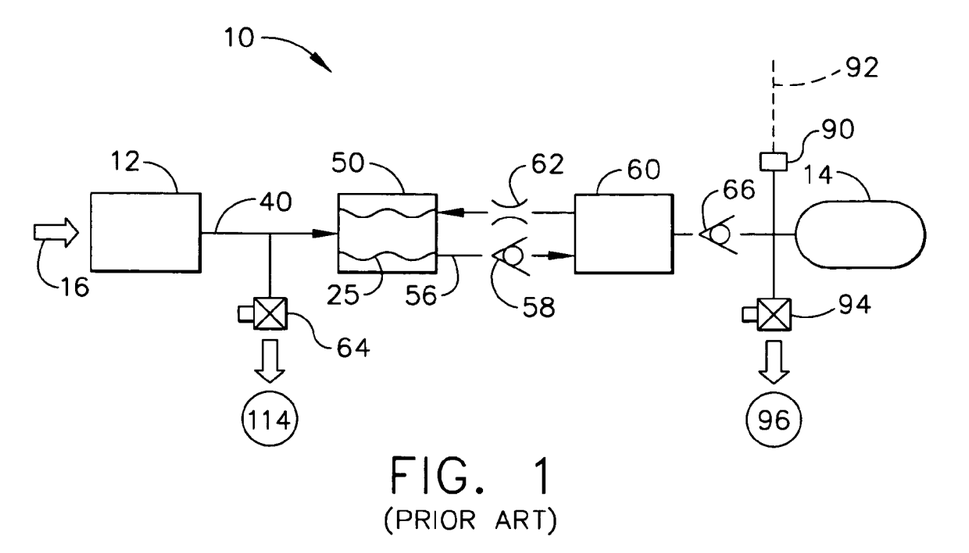
FIG. 1 is a block diagram of an air recharge system according to the prior art.

As shown in FIG. 1, an ARS according to the prior art, referred to as a prior art air recharge system 10, may include an air compressor 12 that may be used to compress or pressurize ambient air 16. The compressed air 40 may then be directed into a desiccant dryer 50 wherein moisture may be removed from compressed air 40 to produce discharge air 56 having a pressure higher than ambient, and also having a lower water content than ambient air 16. Discharge air 56 may then flow through a desiccant outlet check valve 58 to ultimately be retained within an air storage tank 14. Discharge air 56 retained within air storage tank 14 may then be released for use through tank valve 94 to the various aircraft systems, represented generally as 96.

However, once desiccant 25 within desiccant dryer 50 becomes "wet" (e.g., desiccant 25 has absorbed an amount of water limiting the ability of desiccant 25 to absorb a sufficient amount of water from compressed air 40 to produce discharge air 56) desiccant 25 may need to be regenerated, wherein water retained by desiccant 25 (i.e., water adsorbed and/or absorbed by desiccant 25) may be removed from air recharge system 10. Methods of regenerating desiccant 25 may include heating of desiccant 25, and/or passing a dry gas (i.e., a gas having a moisture content at or below the partial pressure of water vapor above desiccant 25) over desiccant 25, to remove water adsorbed by desiccant 25. Desiccant regeneration accomplished by heating of desiccant 25 may require direct thermal contact between desiccant 25 and a heat source (not shown). Such an approach may add complexity, cost, and weight to an aircraft system, and thus may not be desired. Regeneration of desiccant 25 by flowing a dry gas there over may also be employed by utilizing a dry gas from an independent source (not shown). A separate dry air source (not shown) may also add complexity, cost, and weight to the aircraft, and thus, may not be a desired approach.

Desiccant 25 may also be recharged by flowing a portion of the air previously dried by desiccant 25 there over, (i.e., a portion of the air which previously had water removed by desiccant 25). In this approach, discharge air 56 may be allowed to flow back over (i.e., back flush) desiccant 25 at a pressure and at a flow rate which may be less than the pressure and the flow rate at which discharge air 56 was produced. To accomplish a back flush of desiccant 25, a portion of discharge air 56 may be retained in a purge reservoir 60 prior to discharge air 56 entering storage tank 14. Accordingly, purge reservoir 60 may be located downstream of desiccant dryer 50, but upstream of air storage tank 14, such that a storage tank check valve 66 disposed in fluid communication between purge reservoir 60 and air storage tank 14 allows discharge air 56 to flow from purge reservoir 60 into air storage tank 14, but not the reverse.

During back flush of desiccant 25, discharge air 56 may be supplied to desiccant 25 from purge reservoir 60 through a purge orifice 62. After discharge air 56 comes in contact with desiccant 25, the flow of air may include moisture removed from desiccant 25, and may be directed through a purge vent valve 64 to an external environment 114. In this approach, purge orifice 62 may allow dry discharge air 56 to flow back over desiccant 25 at a pressure and at a flow rate which may be less than the pressure and flow rate at which compressed air 40 was previously dried to produce the quantity of discharge air 56 contained within purge reservoir 60.

Figure 2:
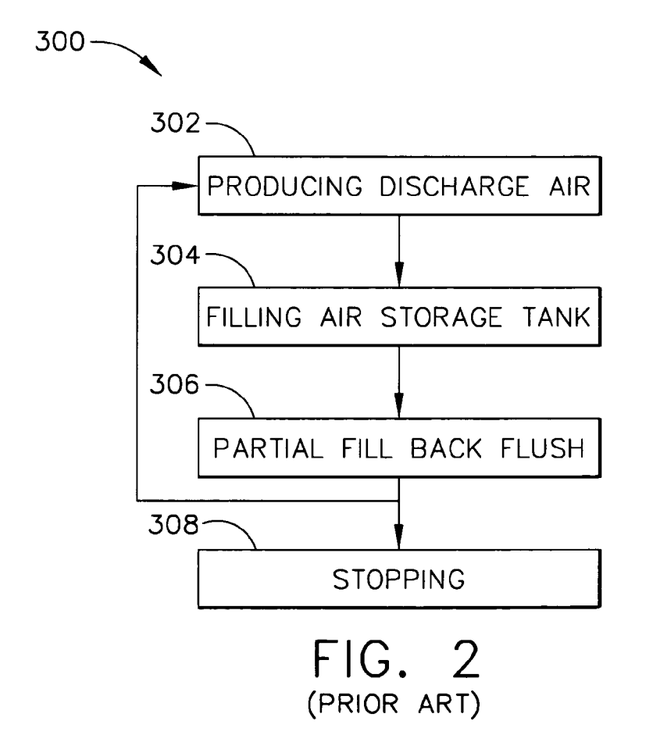
FIG. 2 is a flow chart of the steps of a prior art method for filling recharging an air storage tank.

The method of utilizing this approach practiced in the prior art, referred to herein as a prior art filling method, is generally represented in FIG. 2 as 300. Prior art filling method 300 may include a producing discharge air step 302, wherein actuation of the method resultant from an input, e.g., a storage tank pressure sensor input 92 from a storage tank pressure sensor 90, may actuate air compressor 12 such that compressed air 40 may be produced from ambient air 16 utilizing air compressor 12. Compressed air 40 may then be placed in contact with desiccant 25 to produce discharge air 56. This step may then be followed by a filling air storage tank step 304, wherein discharge air 56 may be directed through desiccant outlet check valve 58 into purge reservoir 60, through storage tank check valve 66, and into air storage tank 14 for a first prior art period of time, wherein such time period may be limited by the ability of desiccant 25 to remove water vapor from compressed air 40 to produce discharge air 56.

After the first prior art period of time at which desiccant 25 may be unable to effectively remove water vapor from compressed air 40 to produce discharge air 56, a partial fill back flush step 306 may be performed, wherein prior to air storage tank 14 being filled with discharge air 56 to a "full" level, as determined by the particular requirements of the system (e.g., a pressure in air storage tank 14), air compressor 12 may cease operation, purge vent valve 64 may be opened such that desiccant 25 may be in fluid communication with external environment 114 through purge vent valve 64. Discharge air 56 may then be allowed to flow through purge orifice 62 and in contact with desiccant 25, wherein at least a portion of moisture adsorbed or absorbed by desiccant 25 may be removed from desiccant 25 into discharge air 56. This moisture laden air (not shown) may then be removed from prior art air recharge system 10 to external environment 114 though purge vent valve 64.

In the art, producing discharge air step 302 may be in operation to produce discharge air 56 for the first prior art period of time during which both purge reservoir 60 and air storage tank 14 are filled. Partial fill back flush step 306 may then be performed for a second prior art period of time, which may be greater than a third prior art period of time which may be required to fill purge reservoir 60. Once partial fill back flush step 306 has concluded (i.e., the second prior art period of time has expired such that purge reservoir has a pressure about equal to ambient pressure), producing discharge air step 302 may then be repeated, as may partial fill back flush step 306, a plurality of times until air storage tank 14 has been fully recharged or filled.

Prior art filling method 300 may further include a stopping step 308, wherein at any point in the method where air storage tank 14 may be determined to be at a full level, operation of air compressor 12 may be stopped, purge vent valve 64 may be opened, and any discharge air 56 contained within purge reservoir 60 may be allowed to back flush desiccant 25.

However, actuation of prior art filling method 300 may only take place when air storage tank 14 requires filling, thus, utilization of prior art filling method 300 may be time consuming in that desiccant 25 may remain at near saturation levels, requiring one or more partial fill back flush step(s) 306 during each cycle of filling method 300. For example, the first prior art period of time may proceed for about 10 minutes, while the second prior art period of time may require 8 minutes (i.e., producing discharge air step 302 and filling air storage tank step 304 for 10 minutes, followed by partial fill back flush step 306 for 8 minutes). This process may need to be repeated 10 or more times to produce enough discharge air 56 to fill air storage tank 14. The time delay caused by partial fill back flush step 306 may thus become undesirable when an operation, such as a maintenance operation, requires a complete discharge, and refill of air storage tank 14. In such a situation, external equipment may need to be procured which may be capable of producing an amount of discharge air 56 sufficient to fill air storage tank 14.

As can be seen, there is a need for improved apparatus and methods of operation of an air recharge system to minimize recharge time of an air storage tank of an emergency power system.

SUMMARY OF THE INVENTION

In one aspect of the present invention, a method to desorb water from a desiccant of an air recharge system comprises the steps of a) filling a purge reservoir, wherein an air compressor is actuated to produce a quantity of compressed air, the quantity of compressed air is then directed into contact with the desiccant such that a portion of moisture within the quantity of compressed air is retained by the desiccant, to produce a quantity of discharge air, the quantity of discharge air is then directed into a purge reservoir for a purge filling period of time sufficient to fill the purge reservoir to a full purge pressure; b) stopping the air compressor; wherein the actuated air compressor is stopped from producing the compressed air, and a purge vent valve in fluid communication with the desiccant is placed in an open position, to place the desiccant in fluid communication with an external environment through the purge vent valve; c) back purging, wherein the quantity of discharge air is directed from the purge reservoir, through a purge orifice disposed between, and in fluid communication with the desiccant and the purge reservoir, such that the quantity of discharge air is in contact with the desiccant for a purge period of time, to produce a quantity of moisture laden air comprising moisture desorbed from the desiccant, the quantity of moisture laden air is then directed through the open purge vent valve to the external environment; and d) vent resetting, wherein the purge vent valve is placed in a closed position, such that the desiccant is not in fluid communication with the external environment, wherein the filling purge reservoir step does not result in an addition of the discharge air to an air storage tank in fluid communication with the purge reservoir and wherein the air storage tank is filled with an amount of the discharge air such that the air storage tank is at a full storage tank pressure prior to the filling purge reservoir step.

In another aspect of the present invention, a method to fill an air storage tank of an air recharge system comprises the steps of a) commencing air storage tank filling, wherein an air compressor is actuated to produce a quantity of compressed air from an ambient air source, for a filling period of time, the quantity of compressed air is then directed into contact with a desiccant such that a portion of moisture within the quantity of compressed air is retained by the desiccant, to produce a fill quantity of discharge air, a first portion of the fill quantity of discharge air is then directed into a purge reservoir for a purge filling period of time sufficient to fill the purge reservoir to a full purge pressure and a second portion of the quantity of discharge air is directed into the air storage tank in fluid communication with the purge reservoir to fill at least a portion of the air storage tank to at least a portion of a full storage tank pressure; b) stopping of air storage tank filling, wherein the air compressor is stopped from producing the quantity of compressed air, based on an input from a pressure sensor in communication with the discharge air disposed within the air storage tank; and a purge vent valve in fluid communication with the desiccant is placed in an open position, to place the desiccant in fluid communication with an external environment through the purge vent valve; c) post fill back purging, wherein the first quantity of discharge air is directed from the purge reservoir, through a purge orifice disposed between, and in fluid communication with the desiccant and the purge reservoir, such that the first quantity of discharge air is in contact with the desiccant for a fill purge period of time, to produce a quantity of moisture laden air comprising moisture desorbed from the desiccant, the quantity of moisture laden air is then directed through the open purge vent valve to the external environment; d) fill vent resetting, wherein the purge vent valve is placed in a closed position, such that the desiccant is not in fluid communication with the external environment, e) followed by a forced start filling of the purge reservoir, wherein the air compressor is again actuated to produce a purge quantity of compressed air, the purge quantity of compressed air is then directed into contact with the desiccant such that a portion of moisture within the purge quantity of compressed air is retained by the desiccant, to produce a purge quantity of discharge air, the purge quantity of discharge air is then directed into the purge reservoir for a purge filling period of time sufficient to fill the purge reservoir to a full purge pressure of about 5,000 psi or higher; f) stopping the air compressor; wherein the air compressor is stopped from producing the purge quantity of compressed air, and the purge vent valve is placed in an open position, g) back purging, wherein the purge quantity of discharge air is directed from the purge reservoir, through the purge orifice such that the purge quantity of discharge air is in contact with the desiccant for a purge period of time, to produce a quantity of moisture laden air comprising moisture desorbed from the desiccant, the quantity of moisture laden air is then directed through the open purge vent valve to the external environment; and h) vent resetting, wherein the purge vent valve is placed in a closed position, such that the desiccant is not in fluid communication with the external environment, wherein the forced start filling of the purge reservoir step does not result in an addition of the discharge air to the air storage tank, and wherein the discharge air has a dew point of $-90°$ F. or less.

In yet another aspect of the present invention, a method to remove moisture from a desiccant of an air recharge system comprises the steps of: a) commencing desiccant regeneration, wherein a back purge cycle counter which tallies a number of back purge cycles conducted is set to zero; b) commencing one of a back purge cycle, wherein the back purge cycle is conducted and the back purge cycle counter is advanced by one; c) followed by a back purge cycle counting step, wherein the back purge cycle counter is compared to a set value of back purge cycles; d) followed by a repeating steps b and c until the back purge cycle counter is equal to the set value of back purge cycles, e) followed by ceasing the desiccant regeneration, wherein the air recharge system is placed at rest, wherein the back purge cycle comprises the steps of: f) filling purge reservoir, wherein an air compressor is actuated to produce a quantity of compressed air, the quantity of compressed air is then directed into contact with the desiccant such that a portion of moisture within the quantity of compressed air is retained by the desiccant, to produce a purge quantity of discharge air, the purge quantity of discharge air is then directed into a purge reservoir for a purge filling period of time sufficient to fill the purge reservoir to a full purge pressure; g) stopping air compressor; wherein the actuated air compressor is stopped from producing the compressed air, and a purge vent valve in fluid communication with the desiccant is placed in an open position, to place the desiccant in fluid communication with an external environment through the purge vent valve; h) back purging, wherein the purge quantity of discharge air is directed from the purge reservoir, through a purge orifice disposed between, and in fluid communication with the desiccant and the purge reservoir, such that the purge quantity of discharge air is in contact with the desiccant for a purge period of time, to produce a quantity of moisture laden air comprising moisture desorbed from the desiccant, the quantity of moisture laden air is then directed through the open purge vent valve to the external environment; and i) vent resetting, wherein the purge vent valve is placed in a closed position, such that the desiccant is not in fluid communication with the external environment, wherein the purge reservoir filling step does not result in an addition of the discharge air to an air storage tank in fluid communication with the purge reservoir and wherein the air storage tank is filled with an amount of the discharge air such that the air storage tank is at a full storage tank pressure prior to the filling purge reservoir step.

In still another aspect of the present invention, a method to remove moisture from a desiccant of an air recharge system located on an aircraft comprises the steps of a) commencing desiccant regeneration, wherein a back purge cycle counter which tallies a number of back purge cycles conducted is set to zero; b) commencing one of a back purge cycle, wherein the back purge cycle is conducted and the back purge cycle counter is advanced by one; c) followed by a back purge cycle counting step, wherein the back purge cycle counter is compared to a set value of back purge cycles; d) followed by a repeating of steps b and c until the back purge cycle counter is equal to the set value of back purge cycles, e) followed by ceasing desiccant regeneration, wherein the air recharge system is placed at rest, wherein the back purge cycle comprises the steps of f) filling purge reservoir, wherein an air compressor is actuated to produce a quantity of compressed air, the quantity of compressed air is then directed into contact with the desiccant such that a portion of moisture within the quantity of compressed air is retained by the desiccant, to produce a purge quantity of discharge air, the purge quantity of discharge air is then directed into a purge reservoir for a purge filling period of time sufficient to fill the purge reservoir to a full purge pressure; g) stopping air compressor; wherein the actuated air compressor is stopped from producing the compressed air, and a purge vent valve in fluid communication with the desiccant is placed in an open position, to place the desiccant in fluid communication with an external environment through the purge vent valve; h) back purging, wherein the purge quantity of discharge air is directed from the purge reservoir, through a purge orifice disposed between, and in fluid communication with the desiccant and the purge reservoir, such that the purge quantity of discharge air is in contact with the desiccant for a purge period of time, to produce a quantity of moisture laden air comprising moisture desorbed from the desiccant, the quantity of moisture laden air is then directed through the open purge vent valve to the external environment; and i) vent resetting, wherein the purge vent valve is placed in a closed position, such that the desiccant is not in fluid communication with the external environment, wherein the filling purge reservoir step does not result in an addition of the discharge air to an air storage tank in fluid communication with the purge reservoir, wherein the purge filling period of time is less than the purge period of time, wherein the air storage tank is filled with an amount of the discharge air such that the air storage tank is at a full storage tank pressure prior to the filling a purge reservoir step, wherein the set value of back purge cycles is based on a moisture content of the desiccant, determined relative to a desiccant moisture sensor in communication with the desiccant, wherein the desiccant is disposed within a desiccant dryer having a desiccant dryer inlet in fluid communication with a desiccant dryer outlet, the desiccant dryer outlet is located between the desiccant dryer inlet and the purge reservoir, and the moisture sensor is disposed proximate to the desiccant dryer inlet, upstream of the desiccant dryer outlet in a direction distal from the purge reservoir, and wherein a ratio of the discharge air required to fill the air storage tank prior to the commencing desiccant regeneration step a, to a total amount of the discharge air produced for the back purging step h, is equal to about 2:1 by volume, or more.

In another aspect of the present invention, an air recharge system comprises an air compressor in fluid communication through a fourth stage check valve with a desiccant disposed within a desiccant dryer, the desiccant dryer having a desiccant dryer inlet in fluid communication with a desiccant dryer outlet; the desiccant dryer outlet is in fluid communication through a desiccant outlet check valve with a purge reservoir, the desiccant dryer outlet is also in fluid communication with the purge reservoir through a purge orifice; the purge reservoir is in fluid communication with an air storage tank through a storage tank check valve, the desiccant dryer inlet is in fluid communication with a purge vent valve operational to provide fluid communication between the desiccant and an external environment, the air recharge system further comprising a controller, the controller in communication with a desiccant moisture sensor, and the desiccant moisture senor is in communication with a portion of the desiccant.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention generally provides an air recharge system suitable for use on an aircraft, the compressed air may be used for starting a main engine or auxiliary power unit, providing emergency power, driving actuators, pressurizing seals, ejecting munitions or for various other purposes. The present invention is directed to a method to desorb water from a desiccant dryer of such an air recharge system, and a method to refill an air storage tank.

In an embodiment of the present invention, the purge reservoir may be pressurized with discharge air (i.e., dried compressed air) while the air storage tank may be in a full state (e.g., while the air storage tank may be at a pressure indicating a full charge of discharge air) thus in the invention the purge reservoir pressurization and air storage tank pressurization may take place at different times. This is in contrast to the prior art wherein the purge reservoir may be pressurized during air storage tank pressurization thus in the prior art the purge reservoir pressurization and air storage tank pressurization may take place at the same time (concurrently).

Also, the present invention may include one or more forced startups of the air compressor to fill the purge reservoir while the air storage tank may be full. This also is in contrast to the prior art, wherein the air compressor may be in operation only when the air storage tank requires filling.

Furthermore, the present invention may utilize a dry desiccant bed that has the capacity to adsorb more moisture than may be collected from air used to completely refill an empty air storage tank, wherein an ARS of the present invention may be run continuously, with no interruption for back purging, until an air tank has been refilled to a full level. Accordingly, the present invention may allow air storage tanks of an ARS to be refilled more quickly, and at the same time the need for unique high pressure-air ground support equipment which may be required for such an operation when utilizing the prior art, may be eliminated. This is unlike the prior art in which the filling of an air storage tank may be interrupted to allow for a back purge and thus drying of the desiccant. This is also unlike the prior art in which the filling of an air storage tank may require unique high pressure-air ground support equipment to allow for a timely filling of a depleted air storage tank.

Figure 3:
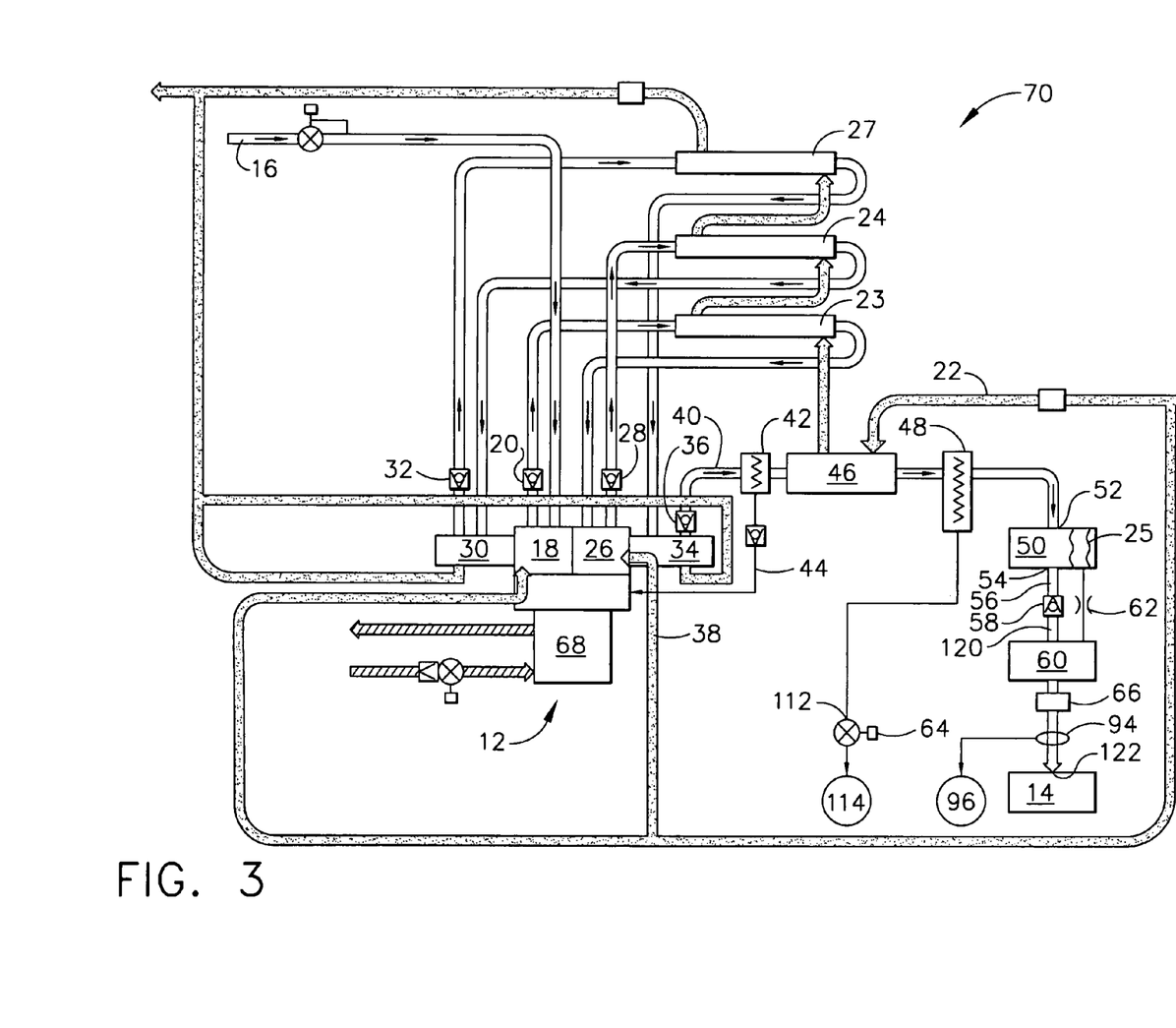
FIG. 3 is a schematic representation of an air recharge system of the present invention.

As shown in FIG. 3, an ARS of the present invention, represented generally by 70, may include air compressor 12, coupled to desiccant dryer 50, which in turn may be coupled to air storage tank 14 through purge reservoir 60, as described in more detail below. In an embodiment, air compressor 12 may include a number of stages, wherein ambient air 16 may be compressed incrementally at each stage to a final pressure of about 5000 psi to about 5500 psi. For example, ambient air 16 may be compressed in a first compressor stage 18, exiting through a first stage check valve 20 through a first stage intercooler 23, and then be directed to a second compressor stage 26, exiting through a second stage check valve 28 through a second stage intercooler 24, and then be directed to a third compressor stage 30, exiting through a third stage check valve 32 through a third stage intercooler 27, and finally directed to a fourth compressor stage 34, from where compressed air 40 exits through a fourth stage check valve 36.

Thermal energy generated from the various compression stages may be removed by flowing a coolant 22 through compressor coolant passages 38 of air compressor 12, and through each of the three intercoolers (i.e., first stage intercooler 23, second stage intercooler 24, and third stage intercooler 27). After exiting fourth compressor stage 34, compressed air 40 may be directed through an oil separator 42, wherein oil removed from compressed air 40 may be returned to air compressor 12 via an oil return conduit 44. Compressed air 40 may then enter aftercooler 46, also cooled by coolant 22, wherein water vapor may be condensed out of compressed air 40. Compressed air 40 may then enter a water separator 48 wherein condensed water may be removed from compressed air 40.

Compressed air 40 may then enter a desiccant dryer 50 containing desiccant 25, through a desiccant dryer inlet 52. Upon exiting desiccant dryer 50 through desiccant dryer outlet 54, compressed air 40 becomes discharge air 56, which may be characterized as having, as an example, a −90° F. dew point dryness or less (i.e., containing less than or equal to about 0.12 gr-$H_2O$/lb-air at 1 atmosphere of pressure). Discharge air 56 may then be directed through a desiccant outlet check valve 58, and then directed into a purge reservoir 60 through a purge reservoir inlet 120. Air storage tank 14 and purge reservoir 60 may then be filled with discharge air 56, which may travel from purge reservoir 60, through a storage tank check valve 66, through a storage tank inlet 122 and into air storage tank 14 in an amount sufficient to produce a final pressure within air storage tank 14 of, for example, about 5000 psi to about 5500 psi.

Figure 5:
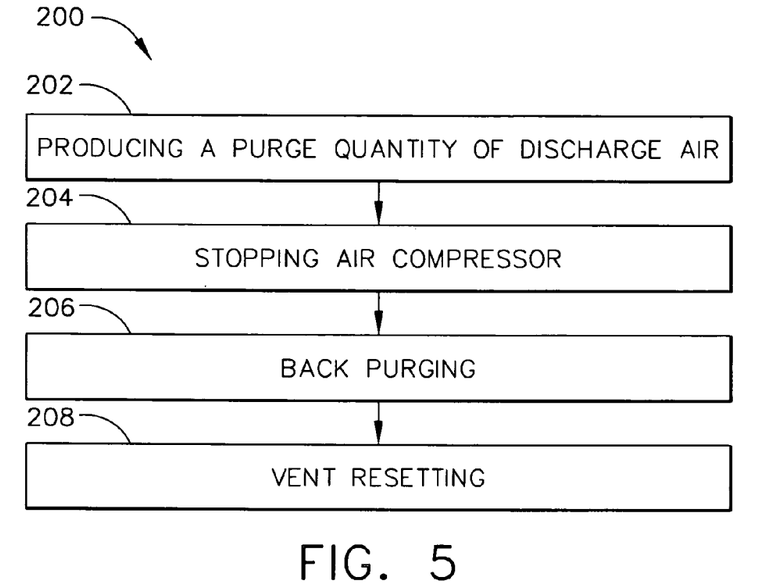
FIG. 5 is a flow chart of the steps of a back purge cycle of the present invention.

In another embodiment, once air storage tank 14 is filled (i.e., air storage tank 14 contains an amount of discharge air 56 sufficient to produce a final pressure within air storage tank 14 of about 5000 psi to about 5500 psi), air compressor 12 may be shut down, and a purge vent valve 64 may be opened to place desiccant dryer inlet 52 in fluid communication with an external environment 114, through a purge vent valve inlet 112 (i.e., desiccant dryer inlet 52 may be in fluid communication with purge vent valve inlet 112 of a purge vent valve 64 operational to provide fluid communication between purge vent valve inlet 112 and external environment 114), and thus, effect a back purge cycle 200, the steps of which are shown in the flow chart of FIG. 5 described in detail herein, of desiccant dryer 50.

During back purge cycle 200, discharge air 56 stored in purge reservoir 60 may be directed through purge orifice 62, through desiccant dryer outlet 54 to be in contact with desiccant 25, wherein moisture may be desorbed from desiccant 25 into discharge air 56 to produce a quantity of moisture laden air (not shown). The moisture laden air then flows through desiccant dryer inlet 52, and exits ARS 70 through purge vent valve 64, which may be opened for that purpose. Purge orifice 62 may be sized such that a first fill time required to fill purge reservoir 60 (e.g., a purge filling period of time) may be less than a second purge period of time required to empty purge reservoir 60 through desiccant dryer 50 during a back purge cycle 200.

Purge orifice 62 thus may provide for a flow of dry discharge air 56 at a lower pressure and/or at a lower flow rate than that of compressed air 40 supplied to desiccant dryer 50 by air compressor 12 to produce discharge air 56. This reverse flow of dry discharge air 56 may then desorb a portion of the water adsorbed or absorbed by desiccant 25 during production of discharge air 56. The net effect of back purge may be a regeneration of desiccant dryer 50 (i.e., removal of adsorbed and/or absorbed water from desiccant 25).

In addition, the present invention may also include additional systems and methods of operation wherein air compressor 12 may be placed into operation even though air storage tank 14 may be in a full state. For simplicity, additional components which may be used in conjunction with systems of the present invention are shown in block diagram form in FIG. 4. Accordingly, each of the blocks labeled in FIG. 4 may include a plurality of interconnected components as shown in FIG. 3.

Figure 4:
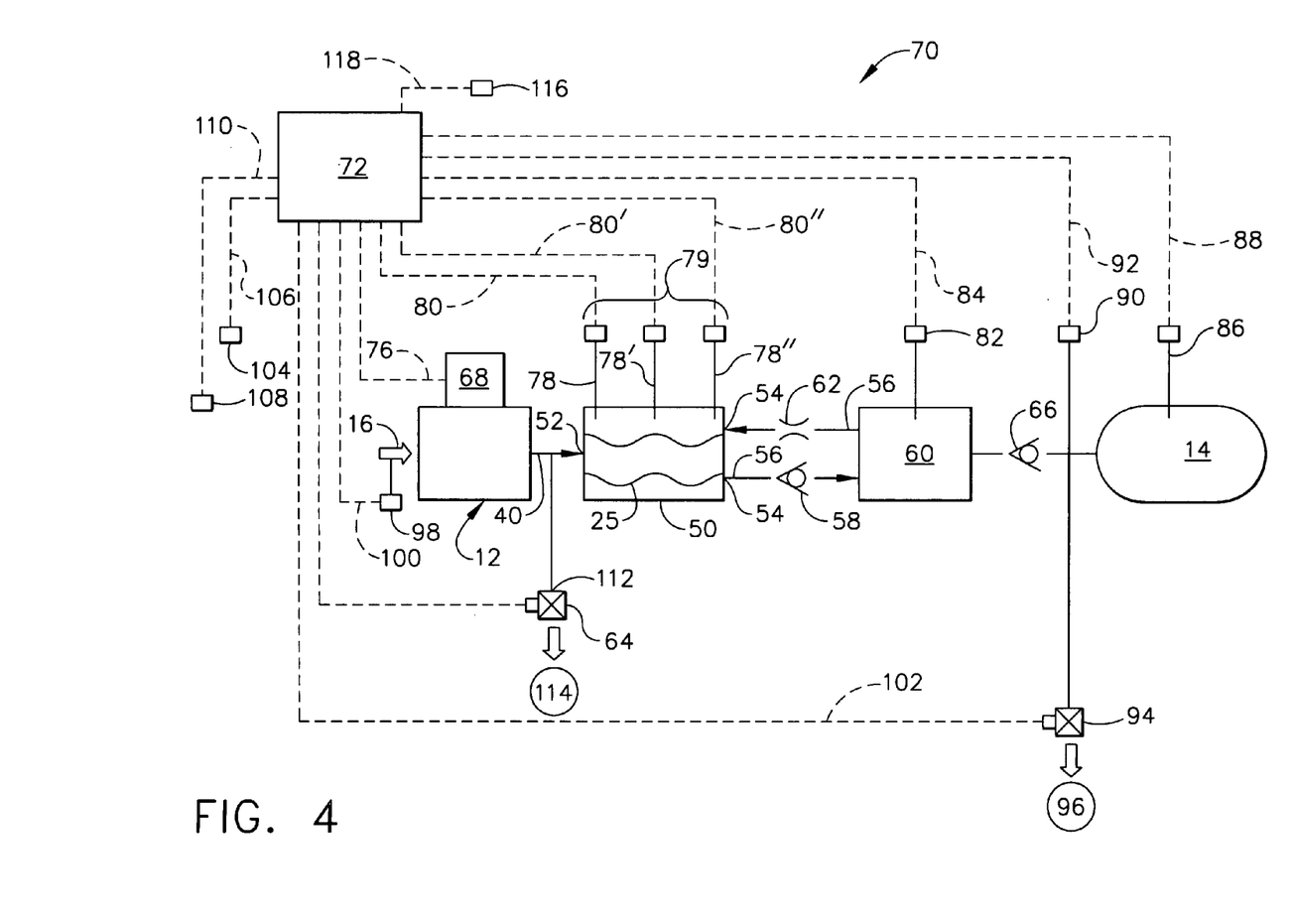
FIG. 4 is a block diagram of an embodiment of an air recharge system of the present invention.

In FIG. 4, ARS 70 of the present invention may include a controller 72, having a plurality of inputs and outputs represented in FIG. 4 by dashed lines, in communication with a plurality of sensors which may be used in controlling ARS 70. Air compressor motor 68 may be controlled (i.e., switched on or off and/or speed controlled) by an air compressor motor output 76. Desiccant dryer 50 may be equipped with a desiccant moisture sensor 78, or with an array of desiccant moisture sensors 79, which may include a plurality of desiccant moisture sensors 78, 78' and 78", each capable of producing an output signal indicative of the amount of moisture present in desiccant 25 at or near a particular location within desiccant dryer 50. Desiccant moisture sensor 78, 78' and/or 78" may be in communication with controller 72 via moisture sensor inputs 80, 80' and/or 80", respectively.

ARS 70 may also include a purge reservoir pressure sensor 82 in communication with controller 72 via a purge reservoir pressure sensor input 84. In addition, ARS 70 may include a storage tank temperature sensor 86 in communication with controller 72 via a storage tank temperature sensor input 88. ARS 70 may further include a storage tank pressure sensor 90 in communication with controller 72 via a storage tank pressure sensor input 92. Tank valve 94 may be in communication with controller 72 via a tank valve output signal 102. ARS 70 may also include an ambient moisture sensor 98 in communication with controller 72 via an ambient moisture sensor input 100, an ambient temperature sensor 104 in communication with controller 72 via an ambient temperature sensor input 106, and an ambient pressure sensor 108 in communication with controller 72 via an ambient pressure sensor input 110. ARS 70 may also include a coolant temperature sensor 116 to determine the temperature of coolant 22 (see FIG. 3), which provides cooling of compressed air 40. Coolant temperature sensor 116 may be in communication with controller 72 via a coolant temperature sensor input 118.

Desiccant 25 may include a material comprising, for example, molecular sieves, silica, zeolites, or a combination thereof. The molecular sieves may also comprise aluminosilicates.

The flow chart in FIG. 5 depicts the steps of back purge cycle 200, which may be part of a method of the present invention, wherein water may be removed from desiccant 25 and ultimately from ARS 70. Back purge cycle 200 may include filling purge reservoir step 202, wherein air compressor 12 may be actuated (e.g., turned on) to produce a quantity of compressed air 40, which may be then directed into contact with desiccant 25 such that a portion of moisture (not shown) within the quantity of compressed air 40 may be retained by desiccant 25, to produce a quantity of discharge air 56. The quantity of discharge air 56 may then be directed into purge reservoir 60 for a purge filling period of time, the purge filling period of time being sufficient to fill purge reservoir 60 to a full purge pressure.

Back purge cycle 200 may also include a stopping air compressor step 204; wherein air compressor 12 may be stopped from producing compressed air 40, and purge vent valve 64 may be placed in an open position (not shown), to place desiccant 25 in fluid communication with external environment 114 through purge vent valve 64. This step may then be followed by a back purging step 206, wherein the quantity of discharge air 56 may be directed from purge reservoir 60, through purge orifice 62 (disposed between, and in fluid communication with, desiccant 25 and purge reservoir 60), such that a quantity of discharge air 56 may be placed in contact with desiccant 25 for a purge period of time, to produce a quantity of moisture laden air (not shown) comprising moisture removed from (e.g., desorbed from) desiccant 25. The quantity of moisture laden air (not shown) may be then directed through purge vent valve 64 to external environment 114.

Back purge cycle 200 may then include a vent resetting step 208, wherein purge vent valve 64 may be placed in a closed position (not shown), such that desiccant 25 may not be in fluid communication with external environment 114.

In back purge cycle 200, purge reservoir filling step 202 may not result in an addition of discharge air 56 to air storage tank 14. In addition, the purge filling period of time may be less than the purge period of time, and the air storage tank 14 may be filled with an amount of discharge air 56 such that air storage tank 14 is at a full storage tank pressure prior to filling purge reservoir step 202. The end result of back purge cycle 200 may be that desiccant 25 may have a much lower moisture content after back purge cycle 200 relative to a time just prior to back purge cycle 200.

The duration of filling purge reservoir step 202 (i.e., purge filling period of time) may be a predetermined period of time, or may be actively controlled by controller 72, utilizing, for example, one or more sensor inputs, e.g., purge reservoir pressure sensor input 84 from purge reservoir pressure sensor 82.

In an embodiment, the purge filling period of time may be less than about 10 minutes. In yet another embodiment, the purge filling period of time may be less than or equal to about 5 minutes, and yet in another embodiment, the purge filling period of time may be less than or equal to about 2 minutes.

Figure 6:
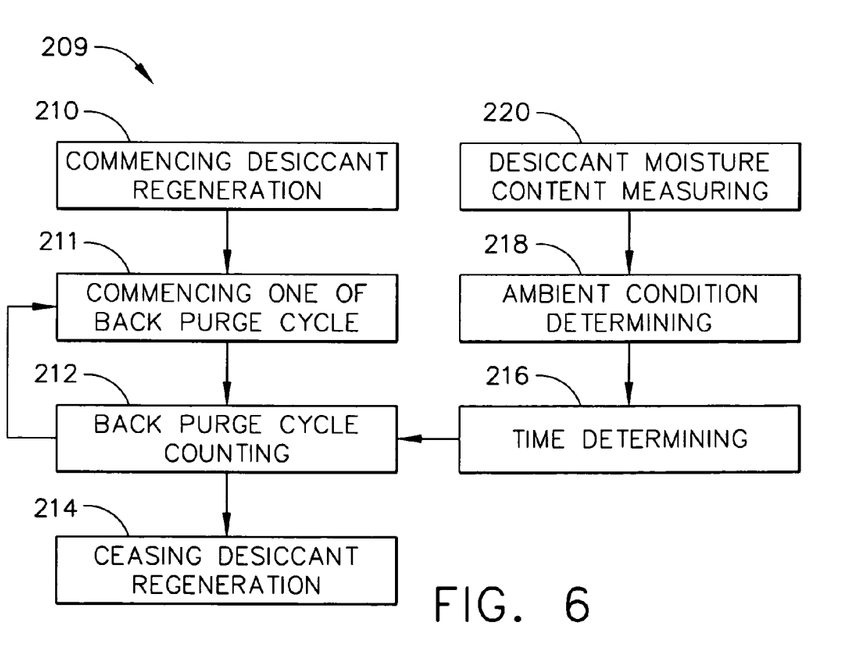
FIG. 6 is a flow chart of the steps of an embodiment of a desiccant regeneration method of the present invention.

In an embodiment, the present invention may include a desiccant regeneration method 209, the steps of which are shown in the flow chart of FIG. 6. Desiccant regeneration method 209, by which water may be removed from desiccant 25 after refill of air storage tank 14, may include a commencing desiccant regeneration step 210, wherein a back purge cycle counter which tallies a number of back purge cycles conducted may be set to zero. Next, desiccant regeneration method 209 may include commencing one of the back purge cycles, step 211, wherein back purge cycle 200 may be conducted and the back purge cycle counter may be advanced by one. This may be followed by a back purge cycle counting or determination step 212, wherein the back purge cycle counter may be compared to a set value of back purge cycles. Next, desiccant regeneration method 209 may include repeating step 211, (i.e., back purge cycle 200 may be again conducted and back purge cycle counter may be advanced by one) and step 212, until the back purge cycle counter may be equal to the set value of back purge cycles, wherein a ceasing desiccant regeneration step 214 may be included such that air recharge system 70 may be placed at rest.

In an embodiment, the set number of back purge cycles to be performed per desiccant regeneration method 209 may 10 or less. In another embodiment, the set number of back purge cycles to be performed per desiccant regeneration method 209 may be 5 or less. In a further embodiment, the set number of back purge cycles to be performed per desiccant regeneration method 209 may be 2 or less.

As is also shown in FIG. 6, desiccant regeneration method 209 may further include a time determining step or act 216, wherein the set value of back purge cycles to be performed may be determined relative to a previous fill time of air storage tank 14, which may be determined relative to a time required to refill air storage tank 14 from a previous use.

In another embodiment, or in addition to those previously discussed, the set value of back purge cycles to be performed may be determined from a running tabulation of a current water content within desiccant 25. This running tabulation may be based on time determining step 216, and/or on an ambient condition determining step 218, and/or a desiccant moisture content measuring step 220, wherein the total run time discharge air 56 was produced to refill air storage tank 14 may be considered with respect to inputs indicative of ambient temperature sensor input 106 delivered from ambient temperature sensor 104, and/or from ambient pressure sensor input 110 delivered from ambient pressure sensor 108, and/or from ambient moisture sensor input 100 delivered from ambient moisture sensor 98, and/or from coolant temperature sensor input 118 delivered from coolant temperature sensor 116. Accordingly, any of several methods to determining moisture content may be used, as may use of temperature to locate a saturation zone by detecting a heat of reaction between the water and desiccant.

Ambient condition determining step 218 may include, alone or in addition to that previously discussed, desiccant moisture content measuring step 220, wherein the moisture content in desiccant 25 may be directly measured, using for example, desiccant moisture sensor input 80 from desiccant moisture sensor 78, or one or more of desiccant moisture sensors inputs 80, 80', and/or 80", delivered from desiccant moisture sensor array 79. In an embodiment, desiccant moisture content measuring step 220 may be made relative to desiccant moisture sensor 78 positioned near desiccant dryer inlet 52 e.g., wherein desiccant 25 may be disposed within desiccant dryer 50 having desiccant dryer inlet 52 in fluid communication with desiccant dryer outlet 54, which may be located between desiccant dryer inlet 52 and purge reservoir 60, and moisture sensor 78 may be disposed proximate to desiccant dryer inlet 52, upstream of desiccant dryer outlet 54 in a direction distal from (i.e., away from) purge reservoir 60.

In addition to more completely removing moisture from desiccant 25, as compared with the prior art, any of the above methods or combinations of methods may be utilized to optimize the components of ARS 70, such that individual components may be reduced in size and/or weight, thus providing a positive result to the aircraft on which they are located. The methods described herein may also be utilized to minimize the number of purge cycles required and thus minimize the energy usage and system wear.

In an embodiment, the ratio of the total amount of discharge air 56 utilized during back purge cycle 200, to a total amount of discharge air 56 required to pressurize air storage tank 14 to a final air storage tank pressure of about 5,000 psi or greater (the ratio referred to herein as a recycle ratio), may be less than or equal to about 1:2 by volume. In another embodiment, the recycle ratio may be less than or equal to about 1:3 by volume, while in another embodiment, the recycle ratio may be less than or equal to about 1:5 by volume.

Air storage tank 14 may be filled to a full level utilizing air recharge system 70. As shown in the flow chart of FIG. 7, the steps of an air storage tank filling method 400 may include a commencing air storage tank filling step 402, wherein air compressor 12 may be actuated to produce a quantity of compressed air 40 from ambient air source 16, for a filling period of time, the quantity of compressed air 40 may then be directed into contact with desiccant 25 such that a portion of moisture (not shown) within the quantity of compressed air 40 may be retained by desiccant (i.e., adsorbed and/or absorbed thereon), to produce a fill quantity of discharge air 56. A first portion of the fill quantity of discharge air 56 may be directed into purge reservoir 60 for a purge filling period of time sufficient to fill purge reservoir 60 to a full purge pressure, and a second portion of the quantity of discharge air 56 may be directed into air storage tank 14 in fluid communication with purge reservoir 60 to fill at least a portion of air storage tank 14 to at least a portion of a full storage tank pressure.

Figure 7:
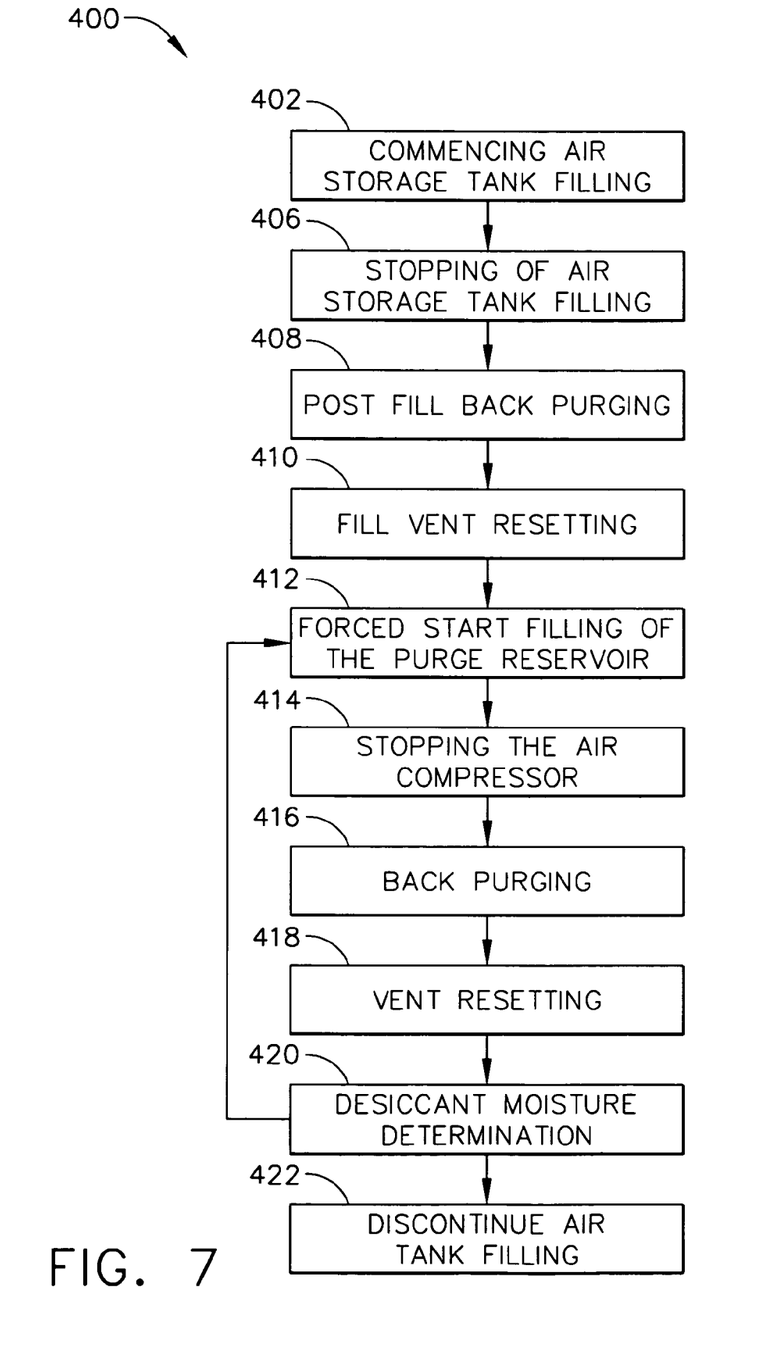
FIG. 7 is a flow chart of the steps of an air storage tank filling method of the present invention.

Commencing air storage tank filling step 402 may be followed by a stopping of air storage tank filling step 406, wherein air compressor 12 may be stopped from producing the quantity of compressed air 40, which may be, for example, based on an input from pressure sensor 86 in communication with discharge air 56 disposed within air storage tank 14; and purge vent valve 64, which may be in fluid communication with desiccant 25, may be placed in an open position (not shown), to place desiccant 25 in fluid communication with external environment 114 through purge vent valve 64. Air storage tank filling method 400 may further include a post fill back purging step 408, wherein the first quantity of discharge air 56 may be directed from purge reservoir 60, through purge orifice 62 disposed between, and in fluid communication with desiccant 25 and purge reservoir 60, such that the first quantity of discharge air 56 may be in contact with desiccant 25 for a purge filling period of time, to produce a quantity of moisture laden air (not shown) comprising moisture desorbed from desiccant 25, the quantity of moisture laden air may then be directed through purge vent valve 64 to external environment 114.

Next, air storage tank filling method 400 may include a fill vent resetting step 410 wherein purge vent valve 64 may be placed in a closed position (not shown), such that desiccant 25 may not be in fluid communication with external environment 114. Fill vent resetting step 410 may then be followed by one or more of a forced start filling of the purge reservoir step 412, wherein air compressor 12 may be again actuated to produce a purge quantity of compressed air 40, the purge quantity of compressed air 40 may then be directed into contact with desiccant 25 such that a portion of moisture (not shown) within the purge quantity of compressed air 40 may be retained by desiccant 25, to produce a purge quantity of discharge air 56 (i.e., a quantity of discharge air sufficient to fill purge reservoir to a full pressure, which may be about 5,000 psi, or higher). The purge quantity of discharge air 56 may then be directed into purge reservoir 60 for a purge filling period of time sufficient to fill purge reservoir 60 to a full purge pressure of about 5,000 psi or higher.

The next step of air storage tank filling method 400 may include a stopping the air compressor step 414; wherein air compressor 12 may be stopped from producing the purge quantity of compressed air 40, and purge vent valve 64 may be placed in an open position (not shown). This step may then be followed by a back purging step 416, wherein the purge quantity of discharge air 56 produced during forced start filling of the purge reservoir step 412 may be directed from purge reservoir 60, through purge orifice 62 such that the purge quantity of discharge air 56 may be in contact with desiccant 25 for a purge period of time, to produce a quantity of moisture laden air (not shown) comprising moisture (not shown) desorbed from desiccant 25. The quantity of moisture laden air (not shown) may then be directed through purge vent valve 64 to external environment 114.

Air storage tank filling method 400 may then include a vent resetting step 418, wherein purge vent valve 64 may be placed in a closed position (not shown), such that desiccant 25 may not be in fluid communication with external environment 114.

In air storage tank filling method 400, forced start filling of the purge reservoir step 412 may not result in an addition of discharge air 56 to air storage tank 14, discharge air 56 may have, for example, a dew point of −90° F. or less, and the purge filling period of time of forced start filling of the purge reservoir step 412 may be less than the purge period of time of back purging step 416.

In an embodiment of air storage tank filling method 400 the second portion of the quantity of discharge air 56 may be sufficient to fill air storage tank 14 to a full storage tank pressure of, for example, about 5000 psi or higher, prior to filling the purge reservoir step 412. Also, air storage tank filling method 400 may include a desiccant moisture determining step 420, a discontinue air tank filling step 422 may be completed, or wherein forced start filling of the purge reservoir step 412 may be repeated based on an input from one or more sensors indicative of a moisture content of desiccant 25.

Desiccant moisture determining step 420, may involve/comprise determination of a moisture content of desiccant 25 based on an input related to an ambient moisture content in ambient air 16, an ambient temperature of ambient air 16, an ambient pressure of ambient air 16, or a combination thereof. Forced start filling of the purge reservoir step 412 may also occur based on the filling period of time required during step 408.

The present invention thus allows for maintaining desiccant 25 in a dryer state as compared to the prior art, by time shifting back purge cycle 200, to a time when air storage tank 14 may be full.

In another embodiment, depending on ambient air conditions such as humidity, temperature and the like, and depending on the amount of discharge air previously produced by ARS 70 (e.g., the number of times air storage tank 14 has been depleted prior to conducting back purge cycle 200), air storage tank 14 may receive a complete recharge from an essentially empty state (i.e., air storage tank contains an amount of discharge air 56 to produce a pressure essentially equal to an ambient pressure), to air storage tank having a full state without a back purge cycle 200 being required during the filling of air storage tank.

It should be understood, of course, that the foregoing relates to exemplary embodiments of the invention and that modifications may be made without departing from the spirit and scope of the invention as set forth in the following claims.

We claim:

1. A method to desorb water from a desiccant of an air recharge system, the method comprising the steps of:
   a) filling a purge reservoir, wherein an air compressor is actuated to produce a quantity of compressed air, said quantity of compressed air is then directed into contact with said desiccant such that a portion of moisture within said quantity of compressed air is retained by said desiccant, to produce a quantity of discharge air, said quantity of discharge air is then directed into a purge reservoir for a purge filling period of time sufficient to fill said purge reservoir to a full purge pressure;
   b) stopping air compressor prior to intended addition of discharge air to an air storage tank; wherein said actuated air compressor is stopped from producing said compressed air, and a purge vent valve in fluid communication with said desiccant is placed in an open position, to place said desiccant in fluid communication with an external environment through said purge vent valve;

c) back purging, wherein said quantity of discharge air is directed from said purge reservoir, through a purge orifice disposed between, and in fluid communication with said desiccant and said purge reservoir, such that said quantity of discharge air is in contact with said desiccant for a purge period of time, to produce a quantity of moisture laden air comprising moisture desorbed from said desiccant, said quantity of moisture laden air is then directed through said open purge vent valve to said external environment; and d) vent resetting, wherein said purge vent valve is placed in a closed position, such that said desiccant is not in fluid communication with said external; and e) repeating steps a) through d) until a desired moisture content of said desiccant is attained, wherein said filling purge reservoir step does not result in an addition of said discharge air to said air storage tank in fluid communication with said purge reservoir, and wherein said air storage tank comprises a quantity of discharge air.

2. The method of claim 1, wherein said discharge air has a dew point of about −90° F. or less.

3. The method of claim 1, wherein said compressed air within said air storage tank has a dew point of about −90° F. or less.

4. The method of claim 1, wherein said full purge pressure is about 5000 psi or greater.

5. The method of claim 1, wherein said air storage tank is at a full storage pressure of about 5000 psi or greater.

6. The method of claim 1, wherein said air compressor is a multiple stage compressor.

7. The method of claim 1, wherein said desiccant comprises molecular sieves, silica, zeolites, or a combination thereof.

8. The method of claim 1, wherein said desiccant comprises molecular sieves.

9. The method of claim 1, wherein said purge filling period of time is less than or equal to about 10 minutes.

10. The method of claim 1, wherein said purge filling period of time is less than or equal to about 5 minutes.

11. The method of claim 1, wherein said purge filling period of time is less than or equal to about 2 minutes.

12. The method of claim 1, wherein said purge filling period of time is based on a pressure of said purge reservoir determined from a purge reservoir pressure sensor in communication with a quantity of discharge air within said purge reservoir.

13. The method of claim 8, wherein said molecular sieves comprises aluminosilicates.

14. A method to fill an air storage tank of an air recharge system comprising the steps of:

a) commencing air storage tank filling, wherein an air compressor is actuated to produce a quantity of compressed air from an ambient air source, for a filling period of time, said quantity of compressed air is then directed into contact with a desiccant such that a portion of moisture within said quantity of compressed air is retained by said desiccant, to produce a fill quantity of discharge air, a first portion of said fill quantity of discharge air is then directed into a purge reservoir for a purge filling period of time sufficient to fill said purge reservoir to a full purge pressure and a second portion of said quantity of discharge air is directed into said air storage tank in fluid communication with said purge reservoir to fill at least a portion of said air storage tank to at least a portion of a full storage tank pressure;

b) stopping of air storage tank filling, wherein said air compressor is stopped from producing said quantity of compressed air, based on an input from a pressure sensor in communication with said discharge air disposed within said air storage tank; and a purge vent valve in fluid communication with said desiccant is placed in an open position, to place said desiccant in fluid communication with an external environment through said purge vent valve;

c) post fill back purging, wherein said first quantity of discharge air is directed from said purge reservoir, through a purge orifice disposed between, and in fluid communication with said desiccant and said purge reservoir, such that said first quantity of discharge air is in contact with said desiccant for a fill purge period of time, to produce a quantity of moisture laden air comprising moisture desorbed from said desiccant, said quantity of moisture laden air is then directed through said open purge vent valve to said external environment;

d) fill vent resetting, wherein said purge vent valve is placed in a closed position, such that said desiccant is not in fluid communication with said external environment, e) followed by a forced start filling of the purge reservoir, wherein said air compressor is again actuated to produce a purge quantity of compressed air, said purge quantity of compressed air is then directed into contact with said desiccant such that a portion of moisture within said purge quantity of compressed air is retained by said desiccant, to produce a purge quantity of discharge air, said purge quantity of discharge air is then directed into said purge reservoir for a purge filling period of time sufficient to fill said purge reservoir to a full purge pressure of about 5,000 psi or higher;

f) stopping the air compressor prior to intended addition of discharge air into said air storage tank; wherein said air compressor is stopped from producing said purge quantity of compressed air, and said purge vent valve is placed in an open position, g) back purging, wherein said purge quantity of discharge air is directed from said purge reservoir, through said purge orifice such that said purge quantity of discharge air is in contact with said desiccant for a purge period of time, to produce a quantity of moisture laden air comprising moisture desorbed from said desiccant, said quantity of moisture laden air is then directed through said open purge vent valve to said external environment;

h) vent resetting, wherein said purge vent valve is placed in a closed position, such that said desiccant is not in fluid communication with said external environment; and i) repeating steps e) through h) until a desired moisture content of said desiccant is attained, wherein said forced start filling of the purge reservoir step does not result in an addition of said discharge air to said air storage tank.

15. The method of claim 14, wherein said second portion of said quantity of discharge air is sufficient to fill said air storage tank to said full storage tank pressure of about 5000 psi or higher, prior to said filling the purge reservoir step.

16. The method of claim 14, further comprising a desiccant moisture determining step, wherein prior to said stopping of air storage tank filling step, said filling a purge reservoir step is commenced based on an input from one or more inputs indicative of a moisture content of said desiccant.

17. The method of claim 14, further comprising a desiccant moisture determining step, wherein prior to said stopping of air storage tank filling step, said filling the purge reservoir step is commenced based on said filling period of time.

18. The method of claim 14, further comprising a desiccant moisture determining step, wherein prior to said stopping of air storage tank filling step, said filling a purge reservoir step is commenced based on an input related to an ambient moisture content in said ambient air.

19. The method of claim 18, further comprising a desiccant moisture determining step, wherein prior to said stopping of air storage tank filling step, said filling a purge reservoir step is commenced based on an input related to an ambient temperature of said ambient air.

20. The method of claim 19, further comprising a desiccant moisture determining step, wherein prior to said stopping of air storage tank filling step, said filling the purge reservoir step is commenced based on an input related to an ambient pressure of said ambient air.

21. A method to remove moisture from a desiccant of an air recharge system, the method comprising the steps of:
 a) commencing desiccant regeneration, wherein a back purge cycle counter which tallies a number of back purge cycles conducted is set to zero;
 b) commencing one of a back purge cycle, wherein said back purge cycle is conducted and said back purge cycle counter is advanced by one;
 c) followed by a back purge cycle counting step, wherein said back purge cycle counter is compared to a set value of back purge cycles;
 d) followed by a repeating steps b and c until said back purge cycle counter is equal to said set value of back purge cycles,
 e) followed by ceasing the desiccant regeneration, wherein said air recharge system is placed at rest,
 wherein said back purge cycle comprises the steps of:
 f) filling purge reservoir, wherein an air compressor is actuated to produce a quantity of compressed air, said quantity of compressed air is then directed into contact with said desiccant such that a portion of moisture within said quantity of compressed air is retained by said desiccant, to produce a purge quantity of discharge air, said purge quantity of discharge air is then directed into a purge reservoir for a purge filling period of time sufficient to fill said purge reservoir to a full purge pressure;
 g) stopping air compressor prior to intended addition of discharge air into an air storage tank; wherein said air compressor is stopped from producing said compressed air, and a purge vent valve in fluid communication with said desiccant is placed in an open position, to place said desiccant in fluid communication with an external environment through said purge vent valve;
 h) back purging, wherein said purge quantity of discharge air is directed from said purge reservoir, through a purge orifice disposed between, and in fluid communication with said desiccant and said purge reservoir, such that said purge quantity of discharge air is in contact with said desiccant for a purge period of time, to produce a quantity of moisture laden air comprising moisture desorbed from said desiccant, said quantity of moisture laden air is then directed through said open purge vent valve to said external environment; and
 i) vent resetting, wherein said purge vent valve is placed in a closed position, such that said desiccant is not in fluid communication with said external environment,
 wherein said filling purge reservoir step does not result in an addition of said discharge air to said air storage tank in fluid communication with said purge reservoir, and
 wherein said air storage tank is filled with an amount of said discharge air such that said air storage tank is at a full storage tank pressure prior to said filling purge reservoir step.

22. The method of claim 21, wherein said set value of back purge cycles is 10 or less.

23. The method of claim 21, wherein said set value of back purge cycles is 5 or less.

24. The method of claim 21, wherein said set value of back purge cycles is 2 or less.

25. The method of claim 21, wherein said set value of back purge cycles is based on an amount of discharge air required to fill said air storage tank to said full storage tank pressure prior to said commencing a desiccant regeneration step a.

26. The method of claim 25, wherein a ratio of said discharge air required to fill said air storage tank, to a total amount of said discharge air produced for said back purging step h, is equal to about 1:2 by volume, or less.

27. The method of claim 25, wherein a ratio of said discharge air required to fill said air storage tank, to a total amount of said discharge air produced for said back purging step h, is equal to about 1:3 by volume, or less.

28. The method of claim 25, wherein a ratio of said discharge air required to fill said air storage tank, to a total amount of said discharge air produced for said back purging step h, is equal to about 1:5 by volume, or less.

29. The method of claim 21, wherein said set value of back purge cycles is based on a moisture content of said desiccant, determined relative to a desiccant moisture sensor in communication with said desiccant.

30. The method of claim 29, wherein said desiccant is disposed within a desiccant dryer having a desiccant dryer inlet in fluid communication with a desiccant dryer outlet, said desiccant dryer outlet located between said desiccant dryer inlet and said purge reservoir, and said moisture sensor is disposed proximate to said desiccant dryer inlet, upstream of said desiccant dryer outlet away from said purge reservoir.

31. The method of claim 21, wherein said set value of back purge cycles is based on a moisture content of said desiccant, determined relative to an array of desiccant moisture sensors in communication with said desiccant.

32. A method to remove moisture from a desiccant of an air recharge system located on an aircraft, the method comprising the steps of:
 a) commencing desiccant regeneration, wherein a back purge cycle counter which tallies a number of back purge cycles conducted is set to zero;
 b) commencing one of a back purge cycle, wherein said back purge cycle is conducted and said back purge cycle counter is advanced by one;
 c) followed by a back purge cycle counting step, wherein said back purge cycle counter is compared to a set value of back purge cycles;
 d) followed by a repeating of steps b and c until said back purge cycle counter is equal to said set value of back purge cycles, e) followed by ceasing desiccant regeneration, wherein said air recharge system is placed at rest, wherein said back purge cycle comprises the steps of:

f) filling purge reservoir, wherein an air compressor is actuated to produce a quantity of compressed air, said quantity of compressed air is then directed into contact with said desiccant such that a portion of moisture within said quantity of compressed air is retained by said desiccant, to produce a purge quantity of discharge air, said purge quantity of discharge air is then directed into a purge reservoir for a purge filling period of time sufficient to fill said purge reservoir to a full purge pressure;

g) stopping air compressor prior to intended addition of discharge air into an air storage tank; wherein said actuated air compressor is stopped from producing said compressed air, and a purge vent valve in fluid communication with said desiccant is placed in an open position, to place said desiccant in fluid communication with an external environment through said purge vent valve;

h) back purging, wherein said purge quantity of discharge air is directed from said purge reservoir, through a purge orifice disposed between, and in fluid communication with, said desiccant and said purge reservoir, such that said purge quantity of discharge air is in contact with said desiccant for a purge period of time, to produce a quantity of moisture laden air comprising moisture desorbed from said desiccant, said quantity of moisture laden air is then directed through said open purge vent valve to said external environment; and i) vent resetting, wherein said purge vent valve is placed in a closed position, such that said desiccant is not in fluid communication with said external environment, wherein said filling purge reservoir step does not result in an addition of said discharge air to said air storage tank in fluid communication with said purge reservoir, wherein said purge filling period of time is less than said purge period of time, wherein said air storage tank is filled with an amount of said discharge air such that said air storage tank is at a full storage tank pressure prior to said filling a purge reservoir step, wherein said set value of back purge cycles is based on a moisture content of said desiccant, determined relative to a desiccant moisture sensor in communication with said desiccant, wherein said desiccant is disposed within a desiccant dryer having a desiccant dryer inlet in fluid communication with a desiccant dryer outlet, said desiccant dryer outlet is located between said desiccant dryer inlet and said purge reservoir, and said moisture sensor is disposed proximate to said desiccant dryer inlet, upstream of said desiccant dryer outlet in a direction distal from said purge reservoir, and wherein a ratio of said discharge air required to fill said air storage tank prior to said commencing desiccant regeneration step a, to a total amount of said discharge air produced for said back purging step h, is equal to about 1:2 by volume, or less.

33. A method for filling at least one air storage tank, comprising:

a) continuously passing compressed air over a desiccant and into said at least one air storage tank until a full storage pressure is attained within said at least one air storage tank; and b) after said step a), running a plurality of sequential compression and purge cycles via a purge reservoir until a desired moisture content of said desiccant is attained, said plurality of sequential compression and purge cycles being conducted without intended addition of compressed air into said air storage tank.

34. A method for filling at least one air storage tank, comprising the steps:

a) actuating a compressor to provide compressed air;

b) via a desiccant, removing moisture from said compressed air to provide discharge air;

c) without stopping said compressor, continuously passing said discharge air into said at least one air storage tank until a full storage pressure is attained within said at least one air storage tank;

d) after said step c), passing dried air into a purge reservoir without intended addition of discharge air into said air storage tank;

e) after said step d), purging said desiccant by passing said dried air from said purge reservoir over said desiccant; and f) sequentially repeating said steps d) and e) until a desired moisture content of said desiccant is attained.

35. The method of claim 34, further comprising: after said step f), repeating said steps a)–c).

36. The method of claim 34, wherein said discharge air has a dew point of about −90° F., and said full storage pressure is about 5000 psi.

* * * * *